(12) United States Patent
Hirota et al.

(10) Patent No.: US 12,385,557 B2
(45) Date of Patent: Aug. 12, 2025

(54) DIFFERENTIAL APPARATUS

(71) Applicant: GKN Automotive Limited, Birmingham (GB)

(72) Inventors: Isao Hirota, Tochigi (JP); Noboru Uchida, Tochigi (JP); Yousuke Kawai, Tochigi (JP); Daisuke Umetsu, Hiroshima (JP); Koji Takahashi, Hiroshima (JP); Koki Yamamoto, Hiroshima (JP); Naoki Hiraga, Hiroshima (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/786,723

(22) Filed: Jul. 29, 2024

(65) Prior Publication Data
US 2025/0084918 A1    Mar. 13, 2025

(51) Int. Cl.
*F16H 48/28* (2012.01)
*F16H 48/08* (2006.01)
*F16H 48/22* (2006.01)
*F16H 48/24* (2006.01)

(52) U.S. Cl.
CPC ............. *F16H 48/28* (2013.01); *F16H 48/08* (2013.01); *F16H 48/22* (2013.01)

(58) Field of Classification Search
CPC .......... F16H 48/28; F16H 48/08; F16H 48/22; F16H 2048/02–2048/426
See application file for complete search history.

(56) References Cited

U.S. PATENT DOCUMENTS

| | | | |
|---|---|---|---|
| 2004/0162179 A1 * | 8/2004 | Krzesicki | F16H 48/24 475/231 |
| 2019/0219143 A1 | 7/2019 | Hirota et al. | |
| 2022/0082135 A1 * | 3/2022 | Tawade | F16D 11/14 |

FOREIGN PATENT DOCUMENTS

| | | |
|---|---|---|
| JP | 2019124264 A | 7/2019 |
| WO | WO-2021192048 A1 * | 9/2021 |

* cited by examiner

*Primary Examiner* — Tinh Dang
(74) *Attorney, Agent, or Firm* — Reising Ethington P.C.

(57) ABSTRACT

An output gear of the differential apparatus includes a gear member and an operating member capable of being integrally rotatably engaged with the gear member via the cam portion. The cam portion includes a gear protrusion on the gear member, an operating protrusion on the operating member, and cam surfaces respectively provided on opposing surfaces of the gear protrusion and the operating protrusion. A corner portion on a tip side of at least one of the gear protrusion and the operating protrusion is provided with a retreating portion.

6 Claims, 4 Drawing Sheets

DIFFERENTIAL APPARATUS

CROSS-REFERENCE TO RELATED APPLICATION

This application is based on and claims priority under 35 U.S.C. 119 to Japanese Patent Application No. 2023-148350, filed on Sep. 13, 2023, the entire contents of which are incorporated herein by reference.

TECHNICAL FIELD

The present disclosure relates to a differential apparatus.

BACKGROUND

JP2019124264A discloses a differential apparatus including a differential case disposed rotatably, a differential gear that is rotatably supported by the differential case and rotates by rotation of the differential case, and a pair of output gears that mesh with the differential gear and can rotate relative to each other. The differential apparatus also includes a differential limiting portion that is provided to be frictionally slidable between the differential case and the output gear and limits a differential rotation between the pair of output gears, and a cam portion that operates the differential limiting portion with driving torque input to the output gears.

In such a differential apparatus, the output gear includes a gear member that meshes with the differential gear, and an operating member that is disposed to be movable in an axial direction and is integrally rotatably engaged with the gear member via the cam portion to operate the differential limiting portion. The cam portion includes a plurality of gear protrusions provided on the gear member, protruding in the axial direction, and arranged in a circumferential direction, and a plurality of operating protrusions provided on the operating member, protruding in the axial direction, arranged in the circumferential direction, and capable of engaging with the adjacent gear protrusions. Cam surfaces are respectively provided on opposing surfaces of the gear protrusion and the operating protrusion in a rotational direction of each other.

In such a differential apparatus, when driving torque is input to the differential case, the driving torque is branched from the differential gear to a pair of output gears. Driving torque input to the pair of output gears operates the cam surface of the cam portion to move the operating member toward the differential limiting portion. The movement of the operating member increases and strengthens sliding friction, which is differential limiting force in the differential limiting portion.

In the differential apparatus of JP2019124264A, when the pair of output gears rotate, the cam surface of the gear protrusion and the cam surface of the operating protrusion, which are opposite in the rotational direction, are engaged in the cam portion. Here, when there are even slight edge-shaped portions such as burrs remaining on tip side corner portions of the gear protrusion and the operating protrusion, the edge-shaped portion will come into contact with the cam surface before the cam surfaces come into contact with each other. When the edge-shaped portion comes into contact with the cam surface first, the contact may affect cam thrust force generated in the cam portion and change the differential limiting characteristics in the differential limiting portion.

SUMMARY

The present disclosure relates to a differential apparatus having stabilized differential limiting characteristics in a differential limiting portion.

In accordance with one or more embodiments, a differential apparatus includes a differential case that is rotatable around a first axis, a differential gear that is supported by the differential case to be rotatable around a second axis, and that is also rotatable around the first axis by a rotation of the differential case around the first axis, the second axis being different from the first axis, a first output gear that meshes with the differential gear, a second output gear that meshes with the differential gear, the first output gear and the second output gear being relatively rotatable to each other, a differential limiting portion that is provided to be frictionally slidable between the differential case and the first output gear, that is configured to limit a differential rotation between the first output gear and the second output gear, and a cam portion that operates the differential limiting portion based on driving torque input to the first output gear. The first output gear includes a gear member that meshes with the differential gear, and an operating member that is movable in a direction of the first axis and is capable of being integrally rotatably engaged with the gear member via the cam portion to operate the differential limiting portion. The cam portion includes a gear protrusion, an operating protrusion, and cam surfaces. The gear protrusion is provided on the gear member and protruding in the direction of the first axis. The operating protrusion is provided on the operating member, protruding in the direction of the first axis, and capable of being engaged with the gear protrusion. The cam surfaces are respectively provided on opposing surfaces of the gear protrusion and the operating protrusion in a rotational direction. A corner portion on a tip side of at least one of the gear protrusion and the operating protrusion is provided with a retreating portion formed to maintain a contact area of the cam surface and to retreat from the cam surface.

According to the differential apparatus of one or more embodiments, it is possible to provide a differential apparatus that can stabilize differential limiting characteristics in a differential limiting portion.

DESCRIPTION OF EMBODIMENTS

Figure 1:
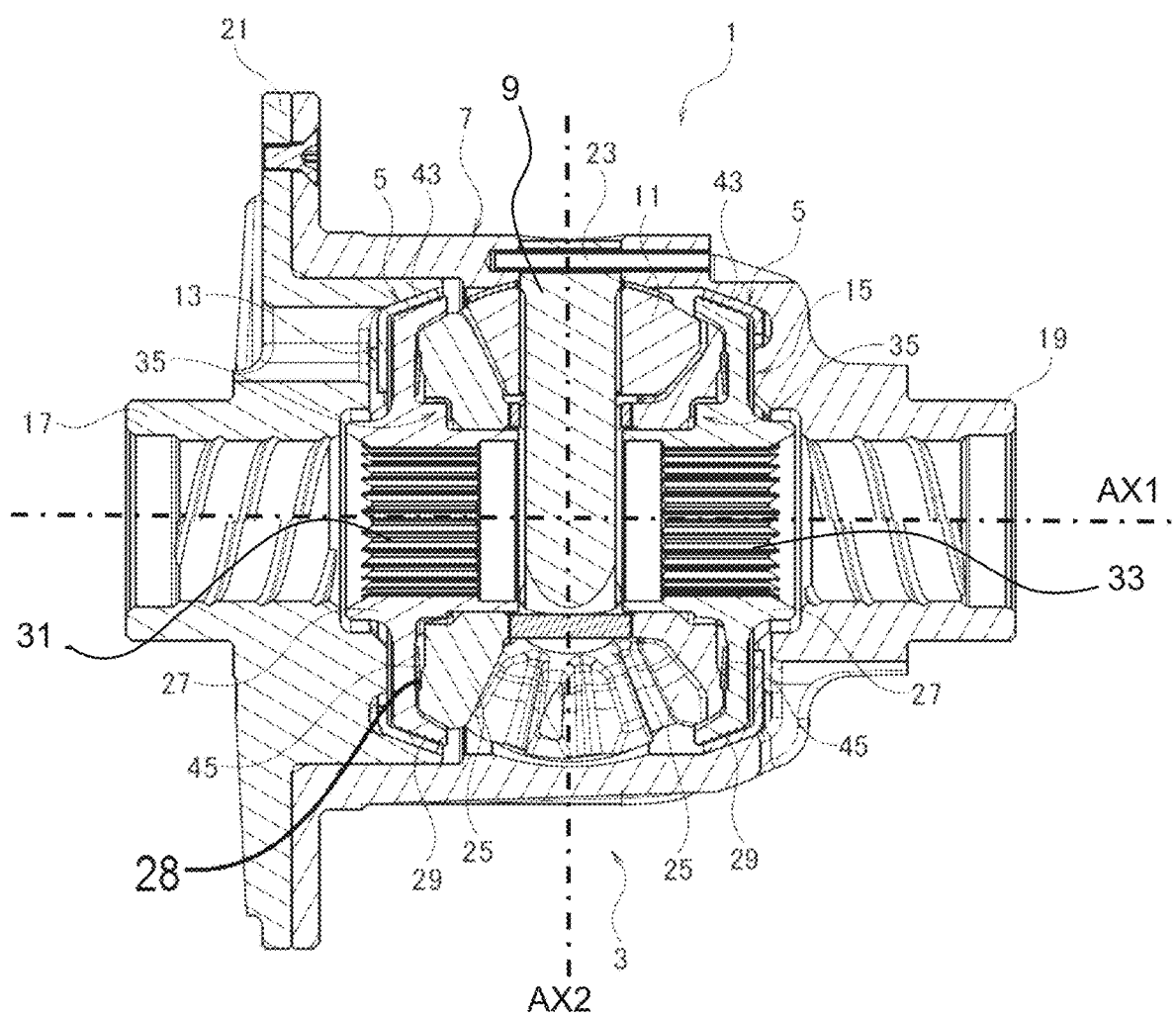
FIG. 1 is a cross-sectional view of a differential apparatus according to an embodiment.
Figure 2:
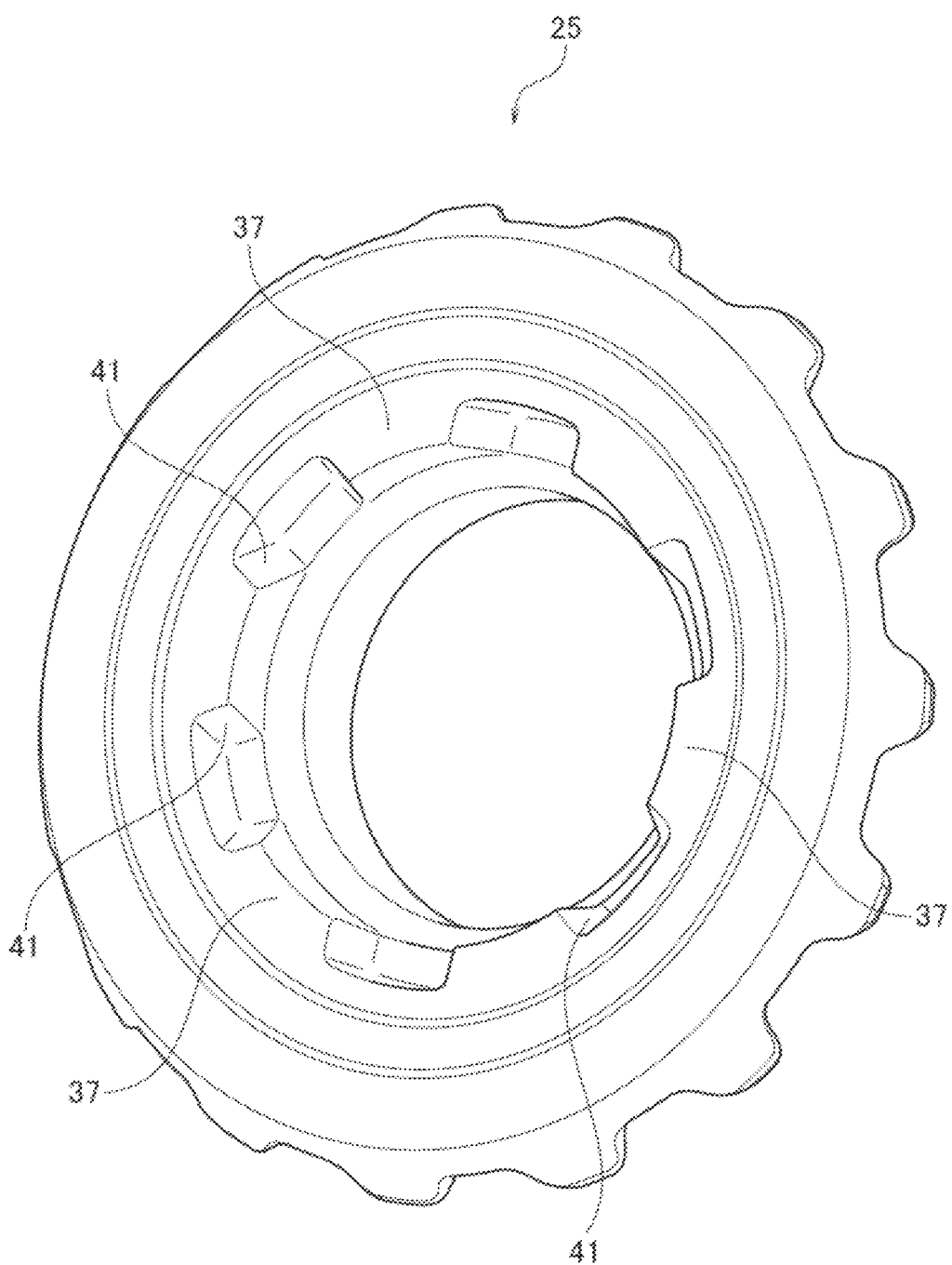
FIG. 2 is a perspective view of a gear member of the differential apparatus.
Figure 3:
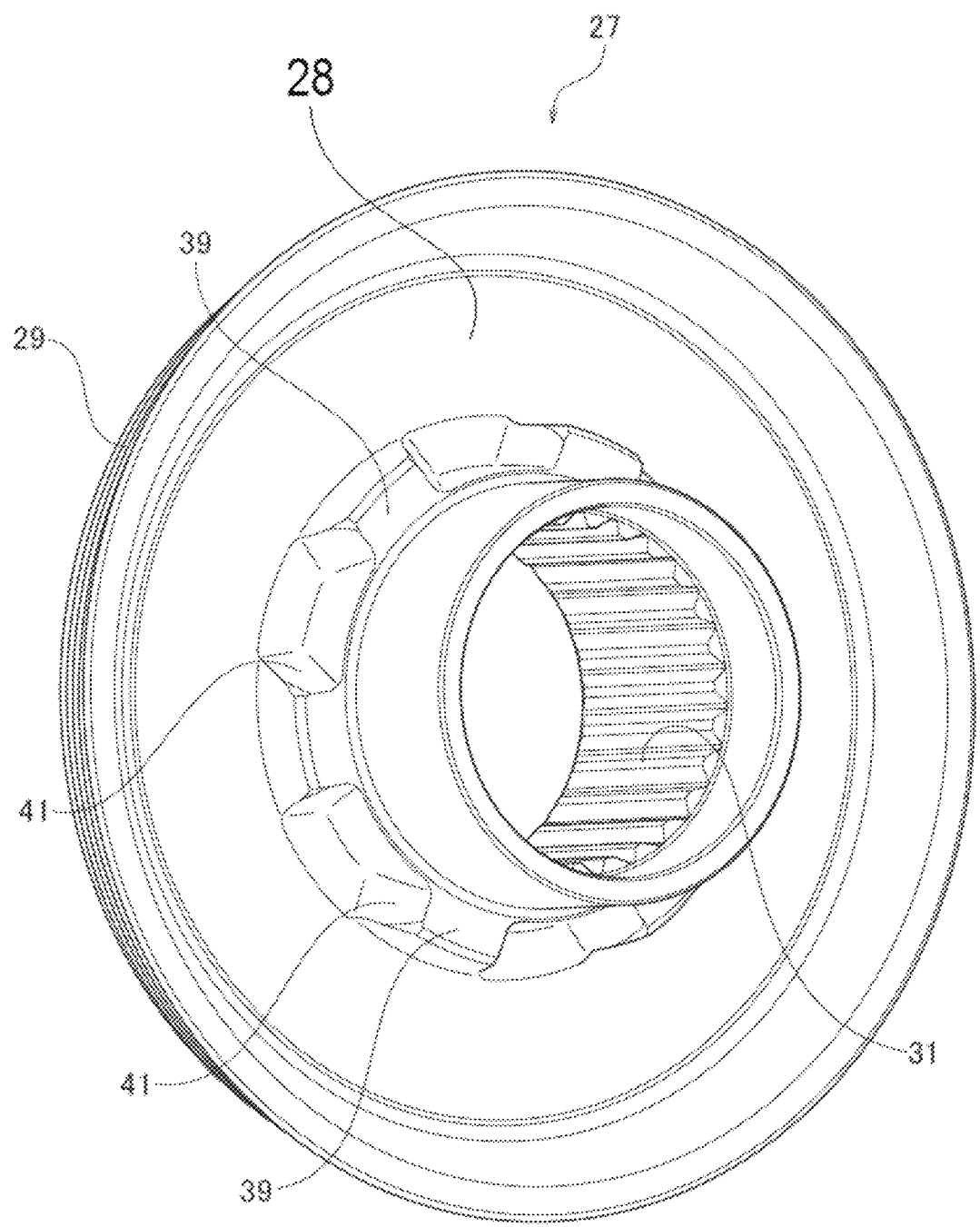
FIG. 3 is a perspective view of an operating member of the differential apparatus.
Figure 4:
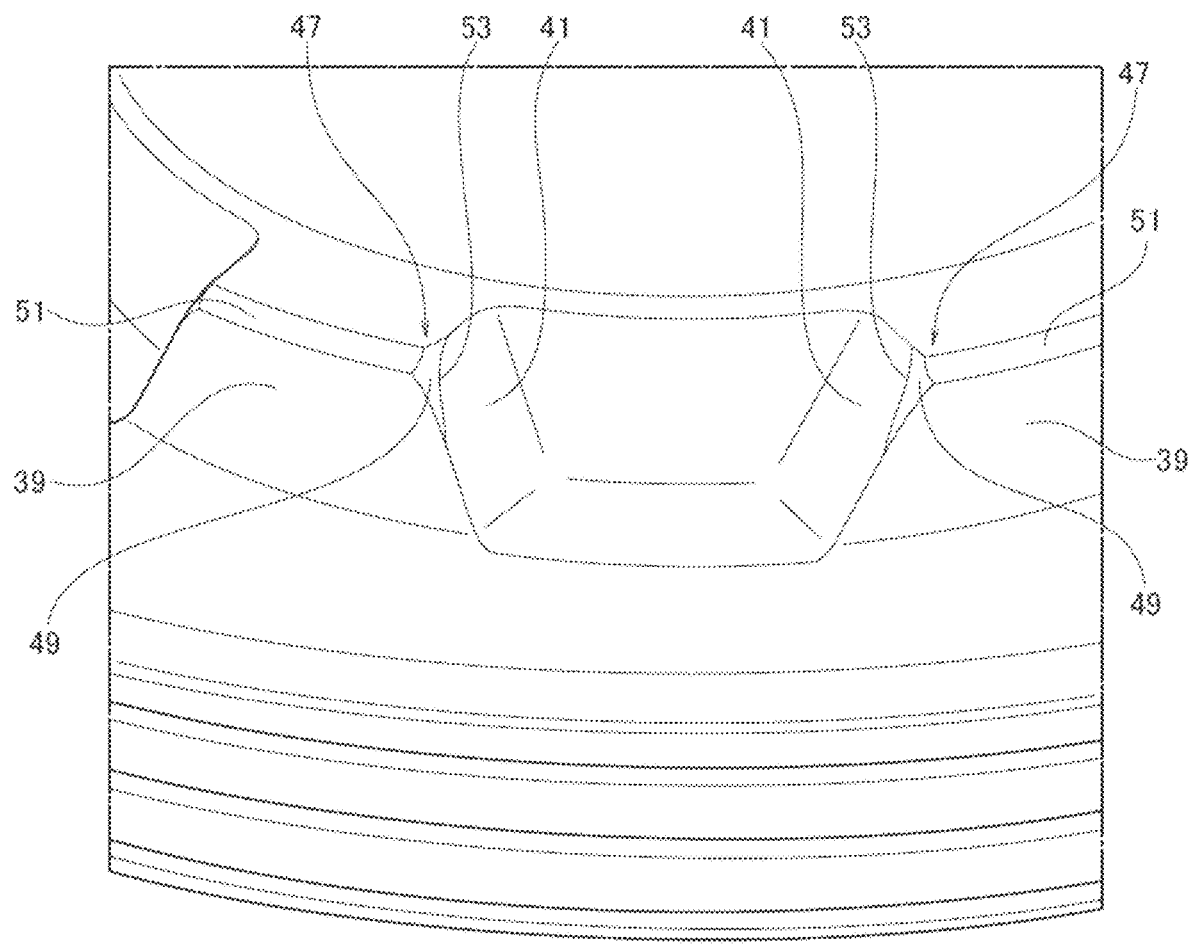
FIG. 4 is an enlarged view of a main part of FIG. 3.

A differential apparatus according to an embodiment will be described in detail using the drawings. Dimensional ratios in the drawings are exaggerated for convenience of explanation and may differ from actual ratios.

As illustrated in FIG. 1, a differential apparatus 1 according to an embodiment is disposed, for example, between a drive source (not illustrated) such as an engine or an electric motor, and left and right wheels (not illustrated). Driving force from the drive source is transmitted to the differential apparatus 1 via a transmission (not illustrated), and the driving force is distributed to the left and right wheels via a pair of output shafts (not illustrated).

As illustrated in FIGS. 1 to 4, the differential apparatus 1 includes a differential mechanism 3 and a differential limiting portion 5.

The differential mechanism 3 includes a differential case 7, a pinion shaft 9, a differential gear 11, and a pair of output gears 13 and 15.

The differential case 7 is rotatably supported by a stationary member (not illustrated) such as a carrier via bearings (not illustrated) at outer peripheries of boss portions 17 and 19 formed on both sides in an axial direction. The differential case 7 is rotatable around a first axis (AX1). In the differential case 7, a flange portion 21 is formed to which a ring gear (not illustrated) is fixed. The ring gear fixed to the flange portion 21 meshes with a power transmission gear (not illustrated) that transmits driving force, and the driving force is transmitted to rotationally drive the differential case 7. The pinion shaft 9, the differential gear 11, a pair of output gears 13 and 15, and the like are accommodated within the differential case 7.

The pinion shaft 9 is provided with an end engaged with a hole formed in the differential case 7, is prevented from slipping out and rotating by a pin 23, and is driven to rotate integrally with the differential case 7 around the first axis (AX1). The differential gears 11 are respectively supported on both shaft ends of the pinion shaft 9 so that the differential gears 11 are rotatable around a second axis (AX2) which is parallel to the pinion shaft 9.

A plurality of differential gears 11 (two in the present example embodiment) are arranged at equal intervals in a circumferential direction of the differential case 7, each of which is supported on the shaft end side of the pinion shaft 9 and rotates as the differential case 7 rotates. The differential gear 11 is rotatably supported by the pinion shaft 9 to transmit driving force to the pair of output gears 13 and 15, and to be driven rotationally when a differential rotation occurs between the pair of output gears 13 and 15 that are meshed with the differential gear 11.

The pair of output gears 13 and 15 are accommodated in the differential case 7 to be rotatable relative to one another. The pair of output gears 13 and 15 each include a gear member 25 and an operating member 27. In the pair of output gears 13 and 15, the gear members 25 and the operating members 27 are formed symmetrically, so only one will be described in detail below, and a description of the other will be omitted.

The gear member 25 is formed in an annular shape, and a gear portion that meshes with the differential gear 11 is formed on an outer circumferential side. When the gear member 25 meshes with the differential gear 11, driving force is transmitted from the differential gear 11 to the pair of output gears 13 and 15. When differential rotation occurs between the pair of output gears 13 and 15, the differential gear 11 is rotated.

The operating member 27 is formed to be disposed close to the gear member 25 in the axial direction in an annular portion 28 having a concave shape to accommodate a portion of the gear member 25 in the axial direction. A sliding surface 29 that is conically inclined in the axial direction is provided at a portion of the operating member 27 that is located on a radially outer side of the gear member 25. Output portions 31 and 33 having cylindrical shapes and having spline shapes that can be integrally rotatably connected to the pair of output shafts in the pair of output gears 13 and 15 are respectively formed on an inner circumferential side of the operating member 27. The operating member 27 outputs the driving force input from the differential case 7 to the pair of output gears 13 and 15 to the left and right wheels via the pair of output shafts.

A cam portion 35 is provided between the gear member 25 and the operating member 27 in the axial direction to convert rotational torque into axial thrust force. The cam portion 35 includes a plurality of gear protrusions 37 provided on an inner peripheral side of the gear member 25, and a plurality of operating protrusions 39 provided on an outer circumferential side of a cylindrical output portion of the operating member 27 and capable of engaging between adjacent gear protrusions 37 and 37. The cam portion 35 engages the gear protrusion 37 and the operating protrusion 39 in a rotational direction, thereby allowing the gear member 25 and the operating member 27 to rotate integrally. The annular portion 28 having a concave shape that can accommodate a part of the gear member 25 in the axial direction is provided on an outer circumferential side of the plurality of operating protrusions 39, and a sliding portion 29 is located on an outer circumferential side of the annular portion 28.

In the cam portion 35, engagement surfaces of the plurality of gear protrusions 37 and the plurality of operating protrusions 39 in the rotational direction are respectively cam surfaces 41 inclined at a predetermined angle. In the cam surface 41 of the cam portion 35, when driving force (driving torque) is input to the differential case 7, the cam portion 35 is operated by driving forces branched and input from the differential gear 11 to the pair of output gears 13 and 15 to move the operating member 27 axially outward. The axial movement of the operating member 27 by the cam portion 35 can increase and strengthen differential limiting force in the differential limiting portion 5 disposed between the differential case 7 and the pair of output gears 13 and 15.

The differential limiting portion 5 is disposed between the differential case 7 and the pair of output gears 13 and 15, respectively. The differential limiting portion 5 includes a tapered ring 43 and the operating member 27 that slide against each other.

The tapered ring 43 is disposed in the differential case 7 at positions corresponding to the sliding surfaces 29 of the operating members 27 of the pair of output gears 13 and 15. The tapered ring 43 rotates integrally with the differential case 7 by engaging a plurality of protrusions formed circumferentially on an inner circumferential side of the tapered ring 43 with recesses formed on an inner wall surface of the differential case 7.

Depending on the magnitude of the driving force (driving torque) input to the differential case 7, the tapered ring 43 slides on the sliding surfaces 29 of the operating members 27 of the pair of output gears 13 and 15, which are moved in the axial direction by meshing reaction force with the differential gear 11. Here, sliding friction between the tapered ring 43 and the sliding surface 29, which is differential limiting force of the differential limiting portion 5, is increased and strengthened by the cam thrust force of the cam portion 35.

The differential limiting portion 5 transmits friction torque between the differential case 7 and the pair of output gears 13 and 15 according to the magnitude of the cam thrust force, and limits the differential of the differential mechanism 3. The differential limiting portion 5 is of a cone clutch type among torque-sensitive friction clutches. The differential limiting portion 5 is preloaded by a biasing member 45.

The biasing member 45 is made of a disc spring and is disposed between the gear member 25 and the operating member 27 in the axial direction. The biasing member 45 biases the gear member 25 axially inward (to the differential gear 11 side) and biases the operating member 27 axially outward (to the differential limiting portion 5 side). By disposing the biasing member 45 between the gear member 25 and the operating member 27, preload can be applied to the differential limiting portion 5, and intermittent characteristics of the differential limiting portion 5 can be stabilized.

In such a differential apparatus 1, the cam portion 35 generates cam thrust force that moves the operating member 27 in the axial direction by engaging the cam surfaces 41 formed on rotational engagement surfaces of the plurality of gear protrusions 37 and the plurality of operating protrusions 39. An edge-shaped portion such as a burr may remain on tip side corner portions of the gear protrusion 37 and the operating protrusion 39, and the edge-shaped portion may protrude from the cam surface 41 in the rotational direction. When the edge-shaped portion protrudes from the cam surface 41 while the cam surfaces 41 of the gear protrusion 37 and the operating protrusion 39 are engaged, it is possible that the edge-shaped portion comes into contact with the cam surface 41 of the other protrusion before the cam surface 41 thereof. When the edge-shaped portion comes into contact with the cam surface 41 first, the cam thrust force generated at the cam portion 35 may be affected, and the differential limiting characteristics at the differential limiting portion 5 may change.

Therefore, a corner portion 47 on a tip side of at least one of the gear protrusion 37 and the operating protrusion 39 is provided with a retreating portion 49 formed to maintain a contact area of the cam surface 41 and retreat from the cam surface 41. Although the following description will be made assuming that the retreating portion 49 is provided at the corner portion 47 of the operating protrusion 39, the retreating portion 49 may be provided at a corner portion on a tip side of the gear protrusion 37.

The corner portion 47 of the operating protrusion 39 is provided with the retreating portion 49 formed to retreat from the cam surface 41 by chamfering or the like to not protrude from the cam surface 41 in the rotational direction. By providing the retreating portion 49 in the corner portion 47, edge-shaped portions such as burrs that protrude from the cam surface 41 in the rotational direction do not occur in the corner portion 47. Therefore, the edge-shaped portion does not come into contact with the cam surface 41 first, and the cam surfaces 41 of the gear protrusion 37 and the operating protrusion 39 can be brought into stable contact. The retreating portion 49 is provided for the corner portion 47 while maintaining the contact area of the cam surface 41 to not affect the set cam thrust force generated by the cam portion 35. Therefore, the contact area of the cam surfaces 41 of the gear protrusion 37 and the operating protrusion 39 does not decrease, the cam thrust force can be stably generated in the cam portion 35, and differential limiting characteristics in the differential limiting portion 5 can be stabilized.

In the corner portion 47 of the operating protrusion 39, three ridgeline portions are continuously formed. Among the three ridgeline portions, at least one ridgeline portion 51 is formed into a flat or curved surface by chamfering or the like. The ridgeline portion 51 formed of a flat or curved surface is a ridgeline portion that is not continuous with the cam surface 41. Therefore, even when the ridgeline portion 51 is formed as a flat or curved surface, the contact area of the cam surface 41 is not affected. The ridgeline portion 51 formed of a flat or curved surface is formed continuously with the retreating portion 49. By making the ridgeline portion 51 continuous with the retreating portion 49, it is possible to prevent an edge-shaped portion such as a burr from occurring in the portion of the ridgeline portion 51 continuous with the retreating portion 49. When the ridgeline portion continuous with the cam surface 41 is made to be continuous with the retreating portion 49, the ridgeline portion may be formed of a flat or curved surface and made continuous with the retreating portion 49 to maintain the contact area of the cam surface 41.

The retreating portion 49 is formed of a flat or curved surface and is provided to be continuous with the cam surface 41 so that the most protruding part of the corner portion 47 retreats from the cam surface 41 in the rotational direction. The flat or curved surface of the retreating portion 49 is connected to the cam surface 41 via a tangent 53 such that an angle formed therebetween is an acute angle. Because the retreating portion 49 is provided with a surface connected at an acute angle from the tangent 53 of the cam surface 41, the surface of the retreating portion 49 does not protrude beyond the cam surface 41 in the rotational direction. Therefore, the cam surfaces 41 of the gear protrusion 37 and the operating protrusion 39 can be brought into stable contact with each other. By forming the retreating portion 49 with a flat or curved surface and connecting the retreating portion 49 to the cam surface 41, it is possible to prevent an edge-shaped portion such as a burr from occurring over a wide range of the retreating portion 49.

The retreating portion 49 is provided at least on the operating member 27 side of the gear member 25 and the operating member 27. Since the operating member 27 is subjected to sliding friction with the tapered ring 43 (differential case 7), the operating member 27 is susceptible to adverse effects of positional deviation due to minute vibrations in the axial and radial directions. By providing the retreating portion 49 on the operating member 27 side that is susceptible to adverse effects, the state of contact between the cam surfaces 41 of the gear protrusion 37 and the operating protrusion 39 can be maintained appropriately. Therefore, the contact area between the cam surfaces 41 of the gear protrusion 37 and the operating protrusion 39 can be secured, and the differential limiting characteristic in the differential limiting portion 5 can be stabilized. In particular, in a configuration in which the sliding portion 29 is disposed at a position away from the plurality of operating protrusions 39 on the outer diameter side, as in the present embodiment, it is possible to prevent a slight vibration of the cam portion 35 being amplified by the sliding portion 29 on a large diameter side, and thus the occurrence of fluctuation in the differential limiting characteristic is prevented.

The differential apparatus 1 of the present example embodiment includes the differential case 7, differential gear 11, the first output gear 13, the second output gear 15, the differential limiting portion 5, and the cam portion 35. The differential case 7 is rotatable around the first axis AX1. The differential gear 11 is supported by the differential case 7 to be rotatable around the second axis AX2. The differential gear 11 is also rotatable around the first axis AX1 by the rotation of the differential case 7 around the first axis AX1. The second axis AX2 is different from the first axis AX2. The first output gear 13 meshes with the differential gear 11. The second output gear 15 meshes with the differential gear 11. The first output gear 13 and the second output gear 15 are rotatable relative to each other. The differential limiting portion 5 is provided to be frictionally slidable between the differential case 7 and the first output gear 13, and is configured to limit a differential rotation between the first output gear 13 and the second output gear 15. The cam portion 35 operates the differential limiting portion 5 based on driving torque input to the first output gear 13. The first output gear 13 includes a gear member 25 that meshes with the differential gear 11 and the operating member 27 that is movable in a direction of the first axis AX1 and is capable of being integrally rotatably engaged with the gear member 27 via the cam portion 35 to operate the differential limiting portion 5. The cam portion 35 includes the gear protrusion 37, the operating protrusion 39, and the cam surfaces 41. The gear protrusion 37 is provided on the gear member 25 and protruding in the direction of the first axis AX1. The operating protrusion 39 is provided on the operating member 27, protruding in the direction of the first axis AX1, and capable of being engaged with the gear protrusion 37. The cam surfaces 41 are respectively provided on opposing surfaces of the gear protrusion and the operating protrusion in a rotational direction. The corner portion 47 on a tip side of at least one of the gear protrusion 37 and the operating protrusion 39 is provided with a retreating portion 49 formed to maintain a contact area of the cam surface 41 and to retreat from the cam surface 41.

Since the corner portion 47 is provided with the retreating portion 49, edge-shaped portions such as burrs that protrude from the cam surface 41 in the rotational direction do not occur in the corner portion 47. Therefore, the edge-shaped portion does not come into contact with the cam surface 41 first, and the cam surfaces 41 of the gear protrusion 37 and the operating protrusion 39 can be brought into stable contact. Even when the retreating portion 49 is formed in the corner portion 47, the contact area of the cam surface 41 is maintained. Therefore, the contact area between the cam surfaces 41 of the gear protrusion 37 and the operating protrusion 39 does not decrease, the cam thrust force can be stably generated by the cam portion 35, and differential limiting characteristics in the differential limiting portion 5 can be stabilized.

Therefore, in such a differential apparatus 1, the differential limiting characteristics in the differential limiting portion 5 can be stabilized.

At least one ridgeline portion 51 connected to the corner portion 47 is continuous with the retreating portion 49.

Therefore, it is possible to prevent edge-shaped portions such as burrs from occurring in the portion of the ridgeline portion 51 that is continuous with the retreating portion 49.

The retreating portion 49 is provided with a surface connected at an acute angle from the tangent 53 of the cam surface 41.

Therefore, the surface of the retreating portion 49 does not protrude from the cam surface 41 in the rotational direction, and the cam surfaces 41 of the gear protrusion 37 and the operating protrusion 39 can be brought into stable contact with each other.

The retreating portion 49 is formed of a flat or curved surface and is connected to the cam surface 41.

Therefore, it is possible to prevent an edge-shaped portion such as a burr from occurring over a wide range of the retreating portion 49 formed of a flat or curved surface. In a space on the surface side where the retreating portion 49 is formed, it is possible to prevent abrasion powder caused by differential over time from entering the cam surface 41 where the powder may be accumulated, so that the cam surfaces 41 can be brought into stable contact with each other.

The retreating portion 49 is formed on the operating member 27 side.

By forming the retreating portion 49 on the operating member 27 side that is susceptible to adverse effects, the state of contact between the cam surfaces 41 of the gear protrusion 37 and the operating protrusion 39 can be maintained appropriately. Therefore, the contact area between the cam surfaces 41 of the gear protrusion 37 and the operating protrusion 39 can be secured, and the differential limiting characteristic in the differential limiting portion 5 can be stabilized.

Although an example embodiment is described above, the claimed invention is not limited thereto, and various modifications can be made within the scope of the described embodiment.

For example, in the differential apparatus according to the disclosure, the operating member and the tapered ring which is disposed to be integrally rotatable with the differential case are slidable. However, the present invention is not limited thereto, and an inner wall surface of the differential case and the operating member may be slidable without using the tapered ring.

When forming the gear member 25 and the operating member 27, the retreating portion 49 can be formed by other suitable methods such as cutting, pressing, laser processing, etching, and the like.

What is claimed is:

1. A differential apparatus comprising:
   a differential case that is rotatable around a first axis;
   a differential gear that is supported by the differential case to be rotatable around a second axis, and that is also rotatable around the first axis by a rotation of the differential case around the first axis, wherein the second axis is different from the first axis;
   a first output gear that meshes with the differential gear;
   a second output gear that meshes with the differential gear, wherein the first output gear and the second output gear are rotatable relative to each other;
   a differential limiting portion that is provided to be frictionally slidable between the differential case and the first output gear, and that is configured to limit a differential rotation between the first output gear and the second output gear; and
   a cam portion that operates the differential limiting portion based on driving torque input to the first output gear;
   wherein the first output gear includes a gear member that meshes with the differential gear, and an operating member that is movable in a direction of the first axis and is capable of being integrally rotatably engaged with the gear member via the cam portion to operate the differential limiting portion;
   wherein the cam portion includes a gear protrusion, an operating protrusion, and cam surfaces, wherein the gear protrusion is provided on the gear member and protruding in the direction of the first axis, wherein the operating protrusion is provided on the operating member, protruding in the direction of the first axis, and capable of being engaged with the gear protrusion, and wherein the cam surfaces are respectively provided on opposing surfaces of the gear protrusion and the operating protrusion in a rotational direction, and
   wherein a corner portion formed by three ridgelines on a tip side of at least one of the gear protrusion and the operating protrusion is provided with a retreating portion formed to maintain a contact area of the cam surface and to retreat from the cam surface.

2. The differential apparatus according to claim 1, wherein at least one ridgeline portion connected to the corner portion is continuous with the retreating portion.

3. The differential apparatus according to claim 1, wherein the retreating portion is provided with a surface connected at an acute angle from a tangent of the cam surface.

4. The differential apparatus according to claim 1, wherein the retreating portion is formed of a flat or curved surface and is connected to the cam surface.

5. The differential apparatus according to claim 1, wherein the retreating portion is formed on the operating member.

6. The differential apparatus according to claim 1, wherein a plurality of gear protrusions are arranged in a circumferential direction, wherein a plurality of operating protrusions are arranged in the circumferential direction.

\* \* \* \* \*

UNITED STATES PATENT AND TRADEMARK OFFICE
CERTIFICATE OF CORRECTION

| | | |
|---|---|---|
| PATENT NO. | : 12,385,557 B2 | Page 1 of 1 |
| APPLICATION NO. | : 18/786723 | |
| DATED | : August 12, 2025 | |
| INVENTOR(S) | : Isao Hirota | |

It is certified that error appears in the above-identified patent and that said Letters Patent is hereby corrected as shown below:

On the Title Page

After (65) Prior Publication Data, insert --(30) Foreign Application Priority Data, Sep. 13, 2023, (JP) 2023-148350--

Signed and Sealed this
Seventh Day of October, 2025

John A. Squires
*Director of the United States Patent and Trademark Office*